United States Patent [19]

Anderson

[11] Patent Number: 5,004,206

[45] Date of Patent: Apr. 2, 1991

[54] VEHICLE SEAT MOUNTING STRUCTURE

[76] Inventor: Scott Anderson, 26450 SE. Highway 224, Eagle Creek, Oreg. 97022

[21] Appl. No.: 470,581

[22] Filed: Jan. 26, 1990

[51] Int. Cl.⁵ ............................................. F16M 13/00
[52] U.S. Cl. .................................... 248/585; 248/631; 267/131; 267/151; 267/225
[58] Field of Search ............... 248/562, 585, 576, 581, 248/589, 591, 631, 564, 566; 267/131, 221, 248, 256, 34, 151, 225

[56] References Cited

U.S. PATENT DOCUMENTS

| | | | |
|---|---|---|---|
| 3,319,920 | 5/1967 | Freedman et al. | 248/576 X |
| 3,628,763 | 12/1971 | Auer | 248/585 X |
| 3,917,209 | 11/1975 | Adams | 248/585 X |
| 3,994,469 | 11/1976 | Swenson et al. | 248/585 |
| 4,093,197 | 6/1978 | Carter et al. | 267/131 |
| 4,350,317 | 9/1982 | Aondetto | 248/562 X |
| 4,733,847 | 3/1988 | Grassl | 248/631 X |
| 7,402,454 | 10/1987 | Izunida | 248/585 |

Primary Examiner—Ramon O. Ramirez
Attorney, Agent, or Firm—Kolisch, Hartwell, Dickinson, McCormack & Heuser

[57] ABSTRACT

A vehicle seat mounting structure includes a base, a seat mount, and a mechanism operably interposed between the base and mount for controlling relative motion thereof. The mechanism includes a platform, air springs to cushion roadway induced shock, and linkage arms to couple the base, seat mount and platform. The mechanism produces a rearward tilting of a seat which is mounted on the structure when vehicle movement tends to throw the seat toward the front of the mounting structure.

18 Claims, 4 Drawing Sheets

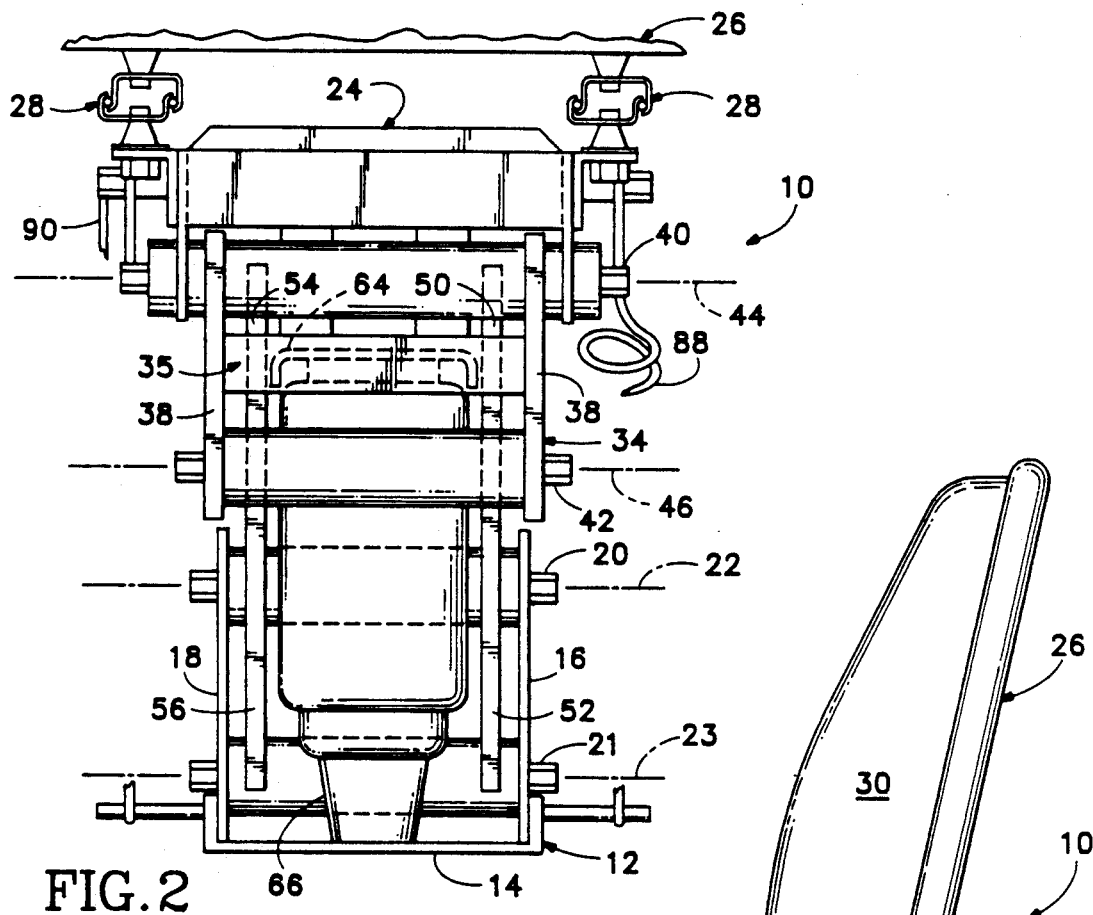
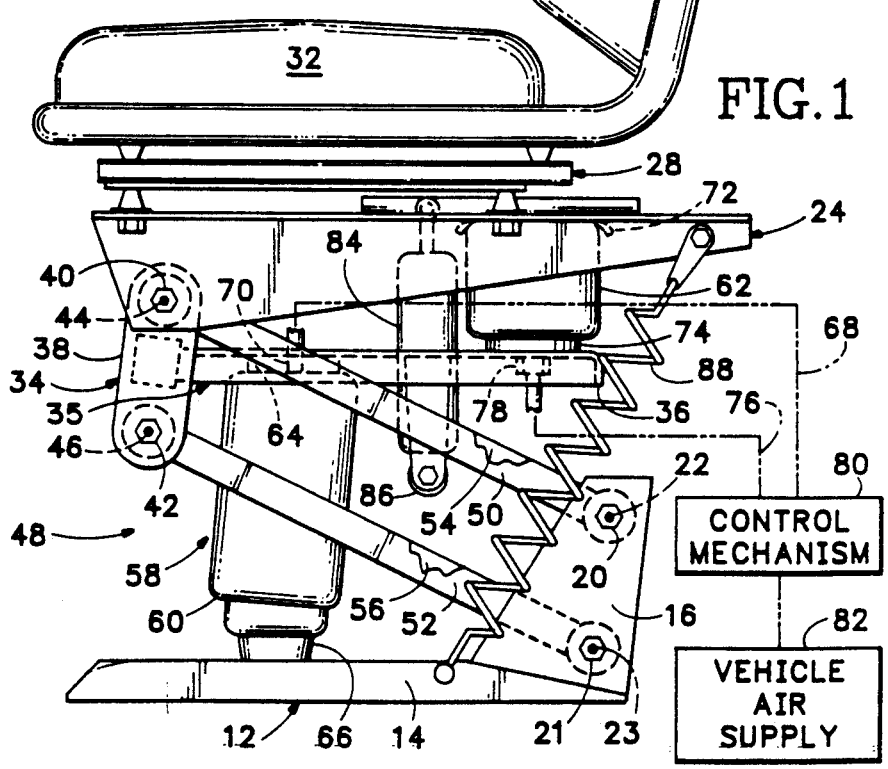
FIG. 2
FIG. 1

VEHICLE SEAT MOUNTING STRUCTURE

BACKGROUND OF THE INVENTION

The instant invention relates to the suspension structure for seats of the type installed in truck tractors. More particularly, the instant design for a vehicle seat mounting structure provides a cushioned, double-link mechanism having a geometry which maintains a truck seat in an orientation relative to a roadway, while a truck-tractor cab containing the mounting structure oscillates in response to irregularities in the roadway.

The driver's seat in the cab of a truck-tractor, of the heavy construction type used for long-haul or heavy duty trucking, must provide proper support and comfort to it's occupant, who is frequently "in-the-seat" for up to ten hours per day. Roadway-produced motions inflicted on a driver, by the tractor cab on the roadway, can lead to serious back problems for long-haul drivers, particularly when the driver operates a cab-over-type tractor.

The cab of a truck tractor moves on its suspension with a pitching motion in a circular arc centered between the front and rear axles of the tractor. The arc is typically located at a position midway between the axles. The pitching motion is transmitted to the driver's seat through a mounting structure which secures the seat to the vehicle cab. As a truck tractor travels over the highway, the pitching motion about the circular arc tends to rock the cab forward and rearward about the axis, which, depending on vehicle load, is generally rearward of and below the driver's seat. In a cab-over, the driver's seat is typically attached to the cab directly over, or perhaps slightly rearward, of the front wheels. The driver's seat in these vehicles is generally spring or shock mounted to cushion the driver's ride as much as possible. However, the rocking action of the cab, combined with the geometry of a conventional seat mounting structure produces the "back-slap" phenomena, alternately separating the seat back from the driver's back and then subsequently forcing the seat back into the driver's back. The cab over produces some peculiar movements due to the relationship of the driver's seat, the engine and the front wheels of the tractor.

Although a number of seat geometries have been disclosed which purport to reduce back-slap, none eliminate the circular pitching motion of the driver's seat which must be eliminated to prevent the back-slap condition and the back pain which results therefrom.

A general object of the invention is to provide a mechanism in a truck seat mounting structure which eliminates the problem of back-slap which occurs in truck-tractors.

Another object of the invention is to provide a seat mounting structure with a circular arcing anti-backslap geometry.

A further object of the instant invention is to provide a truck seat mounting structure which will provide the occupant of a tractor cab with a fixed position relative to a road surface, regardless of tractor cab oscillations.

Another object of the instant invention is to provide a truck seat mounting structure which is adjustable for seat height and seat tilt.

Still another object of the invention is to provide a truck seat mounting which includes a pneumatic cushion mechanism to adjust the seat height and seat tilt through adjustment of an air-spring-suspension-shock-absorbing mechanism.

Another object of the invention is to provide a seat mounting structure which is retrofittable into existing vehicles.

A further object of the invention is to provide a seat mounting which is relatively inexpensive and simple to manufacture.

SUMMARY OF THE INVENTION

The invention includes a linkage geometry mechanism which produces rotation about a pivot point, located towards the front of a seat mounting structure. The mechanism causes a downward rotational and transnational movement of the seat as the truck cab rocks forward, tending to keep the seat and driver in a substantially fixed position relative to the roadway. As the cab rocks rearward, the seat moves up and the rear portion of the seat rotates opposite it's initial downward associated rotation.

The movement of the seat structure of the invention tends to produce movement of the driver relative to the tractor-cab, but results in less movement of the driver and seat relative to the surface over which the vehicle is traveling, thereby reducing the amount of back-slap to which the driver is subjected.

The seat mounting structure of the invention includes a base, which is mounted to the floor of the truck-cab. A linkage geometry mechanism is interposed between the base frame and a seat frame. A set of parallel arms are pivotally attached through the base frame and the seat frame, providing linkage there between. An intermediate reaction member interacts with the seat frame and base frame, allowing rotation of the seat frame about an axle located in the forward portion of the seat frame. An air-spring-shock absorber is located between the base frame and the reaction member and a second air-spring is located between the reaction member and the seat frame. The structure, as described, allows for rotational and transnational movement of the seat frame relative to the base frame. The height of the seat may be adjusted by changing the volume of the air spring located between the base frame and the reaction member, and the tilt of the seat may be adjusted by changing the volume of the air spring located between the action member and the seat frame.

These and other objects and advantages of the instant invention will become more clearly understood as the description which follows is read in conjunction with the company drawings.

DESCRIPTION OF THE DRAWINGS

FIG. 1 is a left-side elevation of a vehicle seat mounting structure constructed according to the instant invention.

FIG. 2 is a front elevation of the structure, with portions broken away to show detail.

DETAILED DESCRIPTION OF THE PREFERRED EMBODIMENTS

Figure 3:
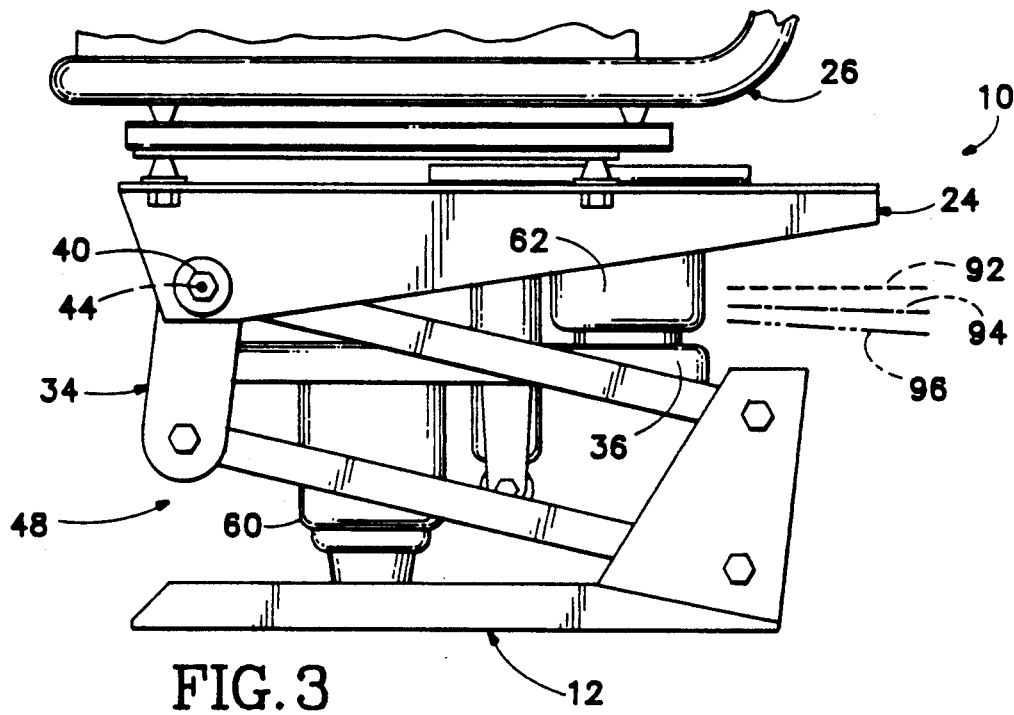
FIGS. 3 and 4 are somewhat schematic representations of the structure shown in FIGS. 1 and 2, depicting the seat in a fully raised and a fully lowered position, respectively.

Turning now to the drawings, and initially to FIGS. 1 and 2, a vehicle seat mounting structure made as contemplated by my invention is shown generally at 10. The structure has a front side which is at the left of FIG. 1, and a rear side which is at the right of the drawing.

The structure includes a base, or base frame, 12 which includes a base plate 14, which is secured to a tractor cab floor (not shown). The tractor cab is in turn secured to a vehicle chassis. Upwardly extending attachment plates 6, 18 are fixed to the base plate at the rear sides thereof in this embodiment. A pair of vertically spaced apart pivot points 20, 21 are located on each attachment plate and define an upper base axis 22 and a lower base axis 23.

A seat mount, or seat frame, 24 is located above base 12 and has a truck seat 26 attached thereto. Seat 26 is attached to mount 24 by means of a set of rails 28, which provide fore and aft movement of the seat relative to the mounting structure and also provide a means for locking the seat in a desired position relative to the mounting structure. Seat 2 is of conventional design and includes a seat back 30, which may or may not include and adjustable lumbar support. A seat cushion 32 provides support for the driver.

Linkage means, shown generally at 34, are located between base 12 and seat mount 24. Linkage means 34 is constructed and arranged to allow substantial vertical movement of the seat mount relative to the base, while simultaneously provide seat movement in a counter-circular arc, which produces an anti-backslap movement in seat 26.

Linkage means 34 includes an intermediate platform, or sub frame, 35 which is located between base 12 and seat mount 24. Platform 35 includes a horizontal extension, or reaction member, 36 and a vertical link 38 on either side of the front edge of extension 36. A pair of vertically spaced apart attachment points 40, 42 are located on each vertical link and define an upper platform axis 44 and a lower platform axis 46.

Elongate Linkage arm means 48 are provided to maintain a substantially parallel relationship between base plate 14 and horizontal extension 36 as seat mount 24 moves vertically relative to base plate 14. Linkage arm means includes a pair of elongate link arms which are located on each side of structure 10, such as left upper link arm 50, left lower link arm 52, right upper link arm 54 and right lower link arm 56. The link arms are pivotally mounted to the attachment plates at the rear of the structure and to the vertical links at the front of the structure. Arms 50 and 54, and 52 and 56 comprise what is referred to herein as upper and lower, respectively, elongated link means, which have one set of ends which pivot about base axes 22, 23, respectively, and another set of ends which pivot about platform axes 44, 46, respectively.

In this embodiment of the invention, seat mount 24 is connected to platform 35 by means of a pivotable joint which is located at attachment point 40. Thus, seat mount 24 is also pivotable about upper platform axis 44.

Cushioning means 58 are provided between base 12 and seat 26 to cushion, or to restrain, the relative movement of the seat and the base. Cushioning means, in the preferred embodiment, includes a pair of air springs 60, 62, which comprise first and second cushioning means, or resilient cushions, respectively. Air spring 60, the first air spring, is interposed between base plate 14 and platform 35. Air spring 62, the second air spring, is interposed between platform 35 and seat mount 24. Air spring 60 is held in place by a first pair of air spring mounts 64, 66 which are secured to platform 35 and base plate 14, respectively. An air line 68 is connected to, and communicates with the interior of, air spring 60 and is held in place by air-tight fastener 70. Air springs 60 and 62 are of the rolling-lobe type, such as those manufactured by Good Year Tire and Rubber company under the "Super-Cushion ®" trademark, and marketed under model numbers 154-008 and 154-007, respectively.

Air spring 62 is held in place by another pair of spring mounts 72, 74, which are attached to platform 35 and seat mount 24, respectively. A second air line 76 connects to, and communicates with, the interior of air spring 62 and is held in place by an air-tight fastener 78. Air lines 68 and 76 are connected to a manual or automatic control mechanism 80, which is in turn connected to a vehicle air supply 82. Mechanism 80 allows the operator to adjust the seat height by adjusting air pressure in spring 60, and to adjust seat frame angle by adjusting air pressure in spring 62. The springs may be individually adjusted to control the degree of anti-backslap action of the structure, as such action will vary with driver weight. The relative moduli of elasticity of the two air springs may be adjusted by control mechanism 80.

Air springs 60, 62 are designed to expand along a vertical axis in response to an increase in internal air pressure. This feature allows the operator to increase the height of seat mounting structure 10 by increasing air pressure within air spring 60. Seat mount 24 may be tilted forward by increasing air pressure within air spring 62.

Air spring 60 has a first known modulus of elasticity while air spring 62 has a second known modulus of elasticity. The air springs are selected such that air spring 60 has a greater modulus of elasticity that air spring 62. The link arms, sub frame and air springs comprise what is referred to herein as a linkage geometry mechanism.

Although the actual pressure inside air spring 62 may exceed the actual pressure inside air spring 60, the relative sizes of the air springs provide that spring 60, also referred to herein as first cushioning means, will be more flexible, or have a greater modulus of elasticity, than that of air spring 62, also referred to herein as second cushioning means. This arrangement results in a tendency of seat mounting structure 10 to change both the height and rearward tilt of seat mount 24 in response to a downward pressure exerted on the mounting structure. However, for any given downward force, there will be a greater change in elevation than there will be in tilt. Air springs may be utilized such that spring 60 is less flexible than in spring 62, or where spring 60 and 62 are equally flexible, or have equal moduli of elasticity, depending on the desire of the user to achieve a given change in elevation relative to tilt.

A shock absorber 84 is located between seat mount 24 and platform 35 to dampen oscillation of the structure. One end of the shock absorber is attached to seat mount 24 and the other end of the shock absorber is attached to a bracket 86, which extends, in the preferred embodiment, downward from platform 35. A pair of retainers, or spring retainer means, 88, 90 are attached to seat mount 24 and base plate 14, and provide resistance to air springs 60, 62, thereby damping the relative motion of seat mount 24 and platform 34 and maintaining pressure on the cushioning means.

Under normal driving conditions, as a tractor cab, to which base 12 is attached, rocks forward, a downward force is exerted on seat 26 as the result of the driver's body reacting to the motion of the cab. Downward motion on seat 26 is transferred along the length of seat mount 24 and initially compresses air spring 62. Compression of air spring 62 results in rearward tilt of seat 32, and the exertion of a force on platform 35. Force on platform 35 is simultaneously transmitted to air spring 60, which results in a compression of the air spring, thereby allowing platform 34 to move vertically downward. Seat mount 24 is allowed to pivot about an axis which allows a rearward tilt, which axis coincides with upper platform axis 44.

As the tractor cab rocks rearward, base 12 moves downward relative to the remainder of structure 10, thereby allowing air springs 60 and 62 to return to their previous heights. As may be expected, there is some tendency for air springs 60 and 62 to pass through what may thought of as their "at-rest condition" and expand length wise. This tendency is over come by springs 88, 90, which restrict the upward and forward tilt tendency of seat mount 24, and by shock absorber 84 which dampens any minor oscillations between platform 36 and seat mount 24.

Figure 4:
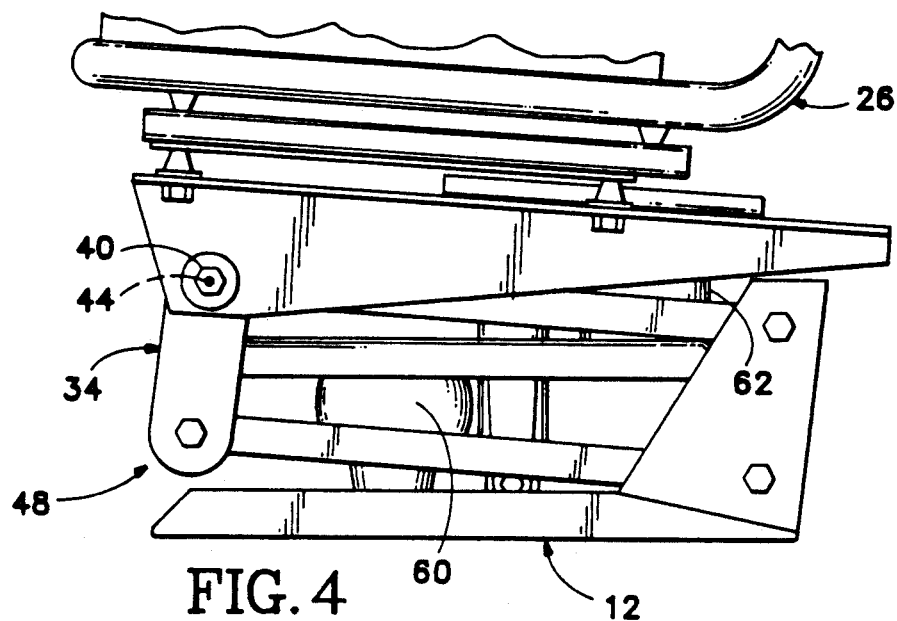

Referring to FIGS. 3 and 4, the mechanism of the seat mounting structure is shown at two stages of compression. FIG. 3 depicts the mechanism in the non-compressed, at-rest condition. Seat mount 24 pivots about upper platform axis 44. A dashed line 92 extends parallel to the upper surface of seat mount 24. As a downward force is applied to seat 26, air springs 60 and 62 (show here in a somewhat schematic form) compress, resulting in rearward tilting and downward movement of the seat and seat frame, as represented by dashed-dot line 94 in FIG. 3, depicting an intermediate stage of structure compression. It should be noted that platform 35 remains parallel to base 12 during the course of seat mount 24's downward and rearward tilting motion.

In FIG. 4, the mechanism of the seat mounting structure shown in a fully compressed position. The angle of seat mount 24 as shown in shown in FIG. 4 is represented by dashed-double-dot line 96 in FIG. 3.

Figure 5:
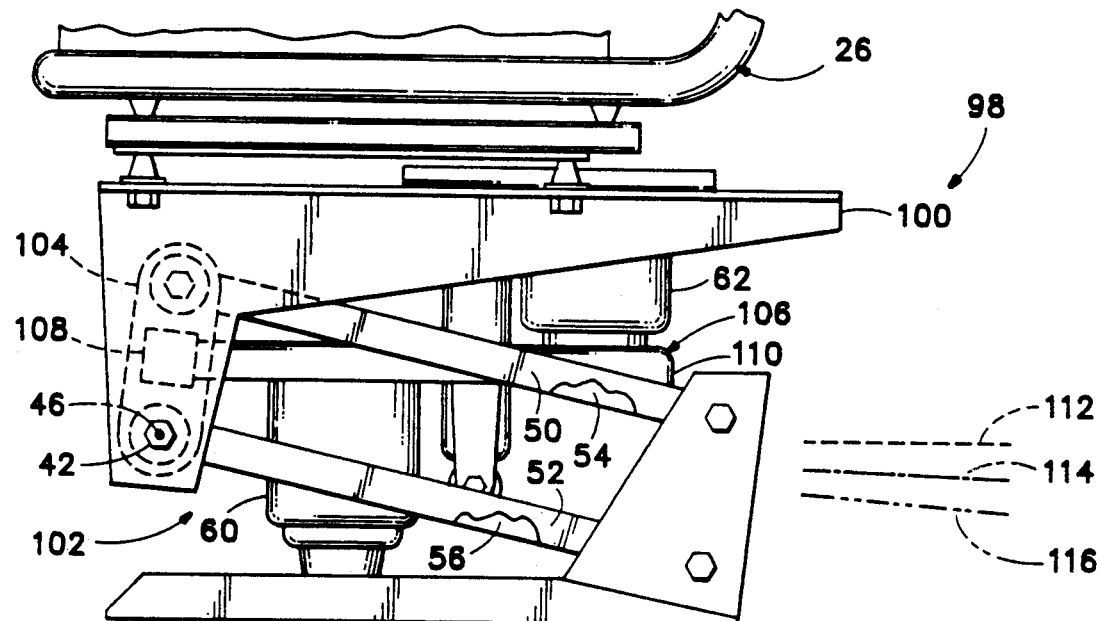
FIGS. 5 and 6 are side elevation views of a second embodiment of the mounting structure of the invention, again depicting the seat in a fully raised and a fully lowered position, respectively.
Figure 6:
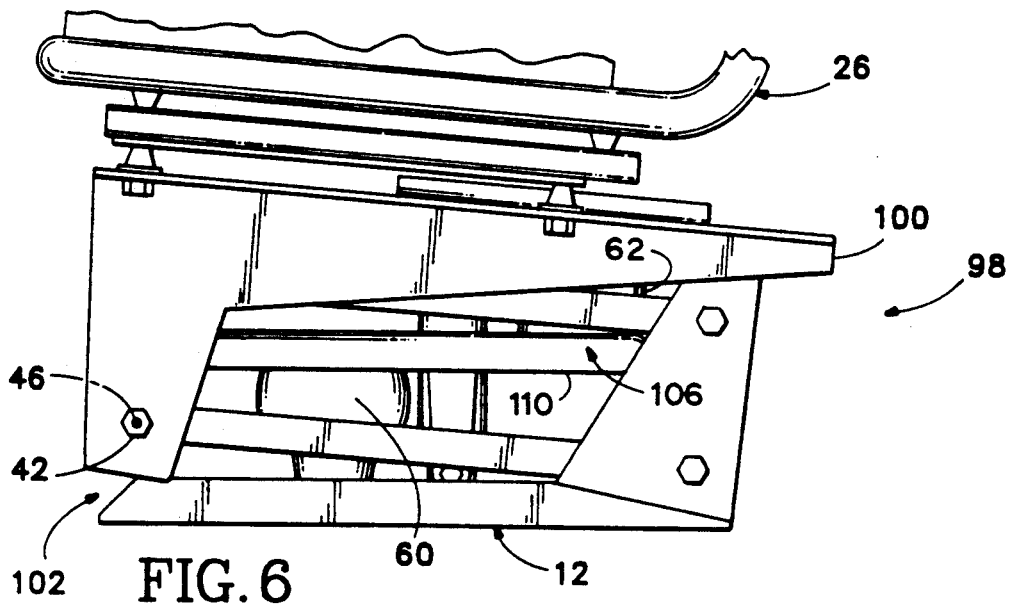

Referring now to FIGS. 5 and 6, a modified form of the invention is depicted at 98. In this embodiment of the invention, a modified seat mount 100 is provided, and is connected to a slightly modified elongate linkage arm mechanism 102, which includes a pivotable joint co-located with lower platform axis 42.

Arm mechanism 102 includes a link arm attachment plate 104, and an intermediate platform 106. Platform 106 includes a cross member 108 and a horizontal extension 110. The seat mount and arm mechanism are supported by link arms 50–56 which are in turn supported on base 12, as previously described. Air springs 60, 62, react with the seat mount, arm mechanism and base.

Lines 112, 114 and 116 originate at axis 42 and represent, respectively, the position of seat mount 100 in FIG. 5, in an intermediate position, and in FIG. 6, as mount 100 pivots about axis 42. This form of the invention provides greater rearward movement of the seat mount then that provided by the first described embodiment. Both configurations described thus far have equal tilting abilities.

Figure 7:
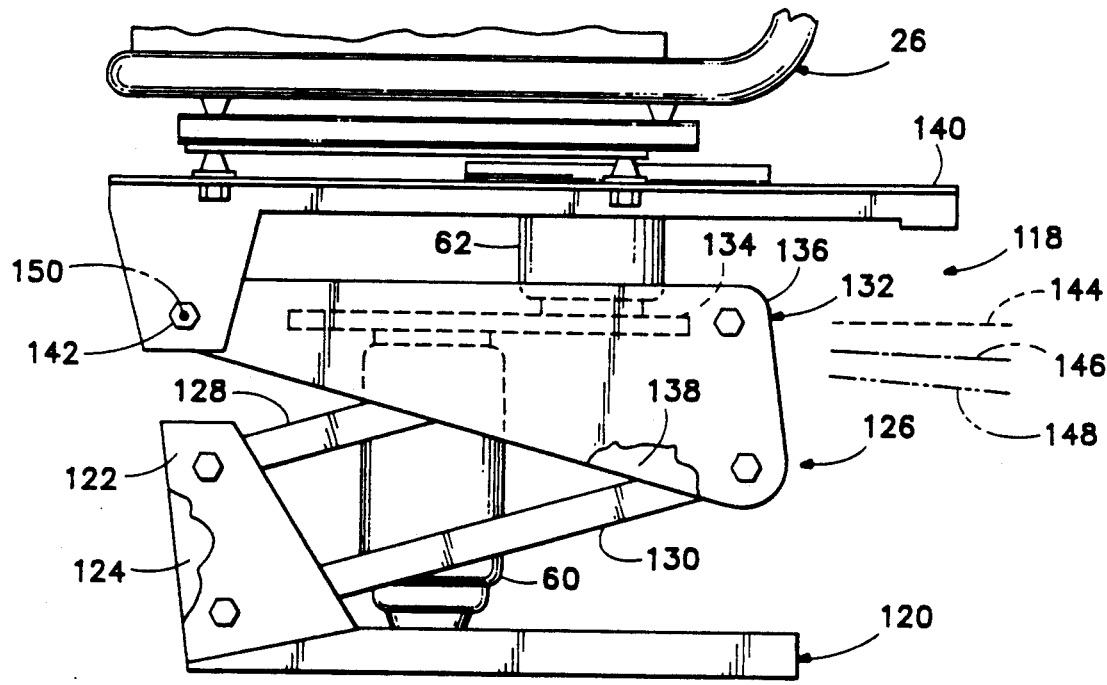
FIGS. 7 and 8 are side elevation views of a third embodiment of the mounting structure of the invention, again depicting the seat in a fully raised and a fully lowered position, respectively.
Figure 8:
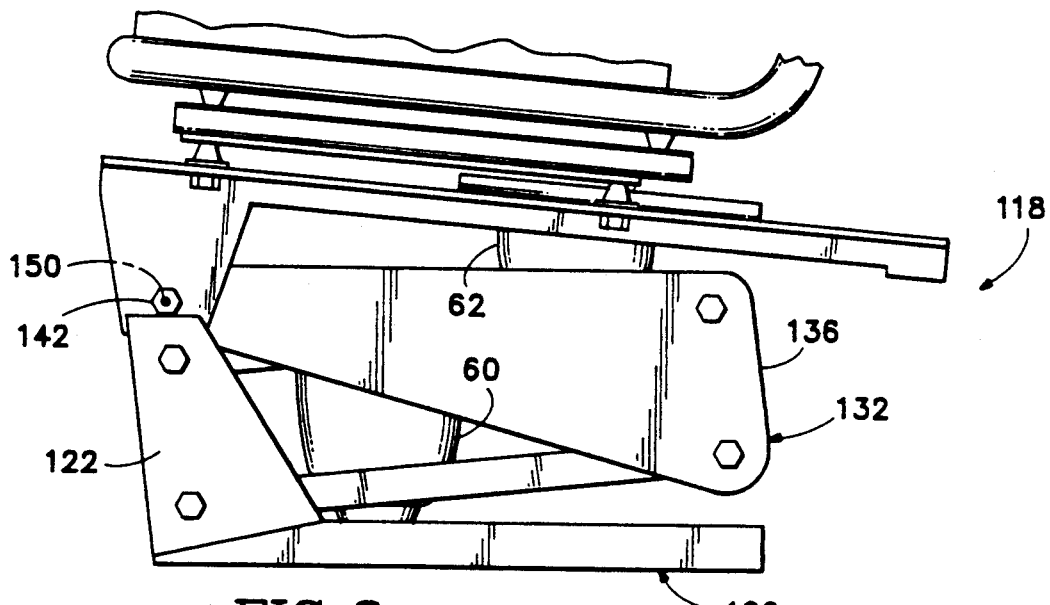

Referring to FIGS. 7 and 8, a third embodiment of the invention is shown at 118. In this embodiment, a base 120 has a pair of modified attachment plates 122, 124, located at the front of the base. A modified linkage arm mechanism 126 includes link arms 128, 130, pivotally attached on the front (left side) of the structure. A similarly attached pair of arms is located on the other side of the structure. Link arms 128, 130 are attached to a modified platform 132 at the rear thereof.

Platform 132 includes a horizontal member 134 which is located between vertically disposed members 136, 138 on either side of the structure A seat mount 140 is connected to the forward edge of the platform by a pivotable joint 142. First and second cushioning means take the form of air springs 60, 62 respectively.

As a downward force is applied to seat mount 140, air springs 60, 62 compress, and seat mount 140 descends vertically and tilts rearward as shown by lines 144, 146 and 148, which originate at pivotable joint 142, and represent the position of the seat mount as the seat mount pivots about an axis 150 which passes through pivotable joint 142. This embodiment of the mechanism of the seat mounting structure produces a greater rearward movement compared to downward vertical misplacement, and is best suited for installation in tractors which exhibit particularly harsh rocking movements.

Thus a new and innovated design in a mechanism of a seat mounting has been disclosed which will relieve a vehicle operator of constant back-slap problems. The structure includes a base and a seat mount and a mechanism interposed between the base and seat mount for controlling motion of a seat relative to a vehicle cab, and produces an anti-backslap motion in the seat which is in effect, opposite that of the vehicle cab, thereby maintaining seat in what has been referred to as a fixed-position relative to a roadway.

While a preferred embodiment, and two modifications thereof have been described, it should be appreciated at that further variations and modifications may be made without departing from the scope of the invention as defined in the appended claims.

I claim:

1. A vehicle seat mounting structure having front and rear sides, comprising
    a base frame securable to a vehicle chassis, a seat frame disposed above the base frame for carrying a seat, and a mechanism operatively interposed between said frames for controlling relative motion therebetween to produce downward tilting of the seat with vehicle movement, tending to throw the seat toward the front side of the mounting structure, said mechanism comprising:
    a sub frame including a reaction member;
    upper and lower elongated link means having one set of the ends pivoted said base frame and another set of ends pivoted on said sub frame;
    means connecting said seat frame and said sub frame; and
    first and second cushioning means, with one of said cushioning means located between said base frame and said reaction member, and the other of said cushioning means located between said reaction member and seat frame.

2. The mechanism of claim 1 wherein said link means one ends pivot on said base frame at the rear of the structure and the other ends pivot on said sub frame at the front of the structure.

3. The mechanism of claim 2 wherein said means connecting is a pivotable joint co-located with said upper link-means other end.

4. The mechanism of claim 2 wherein said means connecting is a pivotable joint co-located with said lower link-means other end.

5. The mechanism of claim 1 wherein said link-means one ends pivot on said base frame at the front of the structure end and said other ends pivot on said sub frame at the rear of the structure.

6. The mechanism of claim 5 wherein said means connecting is a pivotable joint journaled in a forward edge of said reaction member.

7. The mechanism of claim wherein said first cushioning means has a modulus of elasticity greater than that of said second cushioning means.

8. The mechanism of claim 1 wherein said first cushioning means has a modulus of elasticity less than that of said second cushioning means.

9. The mechanism of claim 1 wherein said first and second cushioning means have equal moduli of elasticity.

10. A truck seat support for supporting a seat on a truck-cab floor comprising:
a base, including a plate and a pair of spaced apart, upwardly extending elements located on the sides of said plate, secured to the cab floor;
a seat mount attached to the seat;
linkage means interposed between said base and said mount including a platform having a pair of vertically spaced apart attachment points on each side thereof, and, on each side of the support, a pair of link arms, each of said pairs, at one end thereof, being pivotally secured to said elements at vertically spaced apart points, and, at the other end thereof, being pivotally secured to said platform, said link arms being constructed and arranged to allow substantially vertical movement of said seat mount relative to said base, said arms extending substantially parallel to one another to maintain a substantially parallel relationship between said plate and said platform; and
cushioning means interposed between said base and said seat mount for cushioning the relative movement of said seat mount and said base, said cushioning means including a first resilient cushion, having a first modulus of elasticity, located between said base and said platform, and a second resilient cushion, having a second modulus of elasticity, located between said platform and said seat mount, wherein said first modulus of elasticity is greater than said second modulus of elasticity, said linkage means and said cushioning means being constructed and arranged to maintain said seat mount in a predetermined orientation relative to the surface over which the truck is moving.

11. The support of claim 10 wherein said base includes a pair of opposed, spaced apart upwardly extending elements and a plate connecting said elements disposed on and fastened to the cab floor, said linkage are means includes, on each side of the support, a pair of link arms pivotably attached to each element at vertically spaced apart points, said arms extending substantially parallel to one another to a pair of vertically spaced apart attachment points on said platform, to maintain a substantially parallel relationship between said plate and said platform.

12. The support of claim 11 wherein, with respect to the truck cab, said elements are located at the rear of said base, said attachment points are located at the front of said platform, and said seat mount is pivotally attached to said platform at the lower of said attachment points.

13. The support of claim 11 wherein, with respect to the truck cab, said elements are located at the rear of said base, said attachment points are located at the front of said platform, and said seat mount is pivotally attached to said platform at the upper of said attachment points.

14. The support of claim 11 wherein, with respect to the truck cab, said elements are located at the rear of said platform, and said seat mount is pivotally attached to said platform at the front end thereof.

15. The support of claim 10 which includes a shock absorber extending between said seat mount and said platform for damping said cushioning means.

16. The support of claim 10 which includes retainer means extending between the rear end of said seat mount and said base, for maintaining pressure on said cushioning means.

17. The support of claim 10 which includes means for adjusting the height of said seat mount relative to said base.

18. The seat support of claim 10 which includes means for adjusting said first modulus of elasticity and said second modulus of elasticity while maintaining the relationship wherein said first modulus of elasticity is greater than said second modulus of elasticity.

* * * * *